United States Patent
Ruble et al.

(10) Patent No.: US 10,748,312 B2
(45) Date of Patent: Aug. 18, 2020

(54) TAGGING UTILIZATIONS FOR SELECTIVELY PRESERVING CHART ELEMENTS DURING VISUALIZATION OPTIMIZATIONS

(71) Applicant: MICROSOFT TECHNOLOGY LICENSING, LLC, Redmond, WA (US)

(72) Inventors: B. Scott Ruble, Bellevue, WA (US); Catherine W. Neylan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 130 days.

(21) Appl. No.: 15/042,957

(22) Filed: Feb. 12, 2016

(65) Prior Publication Data

US 2017/0236314 A1    Aug. 17, 2017

(51) Int. Cl.
| | | |
|---|---|---|
| *G06T 11/60* | (2006.01) | |
| *G06F 40/106* | (2020.01) | |
| *G06F 40/151* | (2020.01) | |
| *G06T 3/40* | (2006.01) | |
| *G06T 11/20* | (2006.01) | |

(52) U.S. Cl.
CPC ............ *G06T 11/60* (2013.01); *G06F 40/106* (2020.01); *G06F 40/151* (2020.01); *G06T 3/40* (2013.01); *G06T 11/206* (2013.01)

(58) Field of Classification Search
CPC ......... G06T 11/60; G06T 3/40; G06T 11/206; G09G 2340/145; G06F 40/106; G06F 40/151
See application file for complete search history.

(56) References Cited

U.S. PATENT DOCUMENTS

| | | | | |
|---|---|---|---|---|
| 4,674,042 A | * | 6/1987 | Hernandez | ............ G06T 11/206 345/440 |
| 4,674,043 A | * | 6/1987 | Hernandez | ............ G06F 17/246 345/440 |
| 5,050,221 A | | 9/1991 | Ohta et al. | |
| 5,461,708 A | * | 10/1995 | Kahn | ..................... G06F 17/246 345/440 |
| 5,502,805 A | * | 3/1996 | Anderson | ............. G06F 3/0481 715/209 |
| 5,537,522 A | | 7/1996 | Shibuta et al. | |

(Continued)

FOREIGN PATENT DOCUMENTS

| | | |
|---|---|---|
| EP | 0350353 | 1/1990 |
| EP | 1465114 | 10/2004 |

OTHER PUBLICATIONS

Muñoz, Arturo., "Qlik Sense Search Cheat Sheet", Published on: Oct. 2, 2015 Available at: https://community.qlik.com/blogs/qlikviewdesignblog/authors/amz.

(Continued)

*Primary Examiner* — Devona E Faulk
*Assistant Examiner* — Charles L Beard
(74) *Attorney, Agent, or Firm* — Workman Nydegger

(57) ABSTRACT

Various methods, systems and storage devices are provided for tagging chart elements and for optimizing chart visualizations. Tagged chart elements and their corresponding display attributes are preserved during chart visualization optimizations that result in a modification of untagged chart elements.

19 Claims, 8 Drawing Sheets

(56) References Cited

U.S. PATENT DOCUMENTS

| | | | |
|---|---|---|---|
| 5,557,716 A * | 9/1996 | Oka | G06T 11/206 345/440 |
| 5,561,757 A | 10/1996 | Southgate | |
| 5,596,691 A | 1/1997 | Good et al. | |
| 5,634,133 A * | 5/1997 | Kelley | G06T 11/206 345/440 |
| 5,784,067 A * | 7/1998 | Ryll | G06T 11/206 345/440 |
| 5,894,311 A * | 4/1999 | Jackson | G06T 11/206 345/440 |
| 5,917,499 A | 6/1999 | Jancke et al. | |
| 6,081,611 A * | 6/2000 | Linford | G06T 11/203 382/128 |
| 6,392,662 B1 | 5/2002 | Bou et al. | |
| 6,704,016 B1 | 3/2004 | Oliver et al. | |
| 6,774,899 B1 | 8/2004 | Ryall et al. | |
| 6,812,926 B1 | 11/2004 | Rugge | |
| 7,027,628 B1 | 4/2006 | Gagnon et al. | |
| 7,194,697 B2 | 3/2007 | Sinclair et al. | |
| 7,287,234 B2 | 10/2007 | Leah et al. | |
| 7,362,804 B2 | 4/2008 | Novotny et al. | |
| 7,627,517 B2 * | 12/2009 | Badenhorst | G06Q 40/04 345/619 |
| 7,663,627 B2 * | 2/2010 | Iguchi | G06T 11/206 345/440 |
| 7,783,708 B2 * | 8/2010 | Zaner-Godsey | H04L 51/08 709/206 |
| 7,917,382 B2 * | 3/2011 | Cereghini | G06Q 30/02 705/7.29 |
| 7,949,954 B1 * | 5/2011 | Jezek, Jr. | G06F 3/048 715/800 |
| 7,961,188 B2 * | 6/2011 | Tolle | G06Q 10/10 345/440 |
| 7,986,935 B1 * | 7/2011 | D'Souza | G06Q 30/02 379/114.02 |
| 8,068,121 B2 | 11/2011 | Williamson et al. | |
| 8,219,453 B1 | 7/2012 | Iida et al. | |
| 8,239,765 B2 * | 8/2012 | Alsbury | G06F 1/1626 715/273 |
| 8,255,791 B2 * | 8/2012 | Koren | G06F 3/0484 715/227 |
| 8,452,785 B1 | 5/2013 | Iida et al. | |
| 8,527,909 B1 * | 9/2013 | Mullany | G06F 3/0484 345/173 |
| 8,605,090 B2 * | 12/2013 | Garg | G06F 16/904 345/440 |
| 8,605,109 B1 | 12/2013 | Gulley | |
| 8,660,869 B2 | 2/2014 | MacIntyre et al. | |
| 8,682,046 B2 | 3/2014 | Kajimoto et al. | |
| 8,723,870 B1 | 5/2014 | Libicki et al. | |
| 8,781,742 B2 | 7/2014 | Albrecht | |
| 8,810,574 B2 | 8/2014 | Alsbury et al. | |
| 8,810,595 B2 | 8/2014 | Holm-Peterson et al. | |
| 8,823,711 B2 | 9/2014 | Mital et al. | |
| 8,856,655 B2 * | 10/2014 | Pendergast | G11B 27/34 715/723 |
| 8,914,740 B1 | 12/2014 | Joos et al. | |
| 8,957,920 B2 | 2/2015 | Giambalvo et al. | |
| 9,035,949 B1 * | 5/2015 | Oberheu | G06T 11/206 345/440 |
| 9,053,583 B1 * | 6/2015 | Gross | G06F 19/3418 |
| 9,081,474 B2 | 7/2015 | Louch et al. | |
| 9,158,766 B2 | 10/2015 | Blyumen | |
| 9,183,650 B2 * | 11/2015 | Ruble | G06F 3/04842 |
| 9,201,578 B2 | 12/2015 | Scott et al. | |
| 9,202,297 B1 | 12/2015 | Winters et al. | |
| 9,226,672 B2 | 1/2016 | Taylor | |
| 9,230,351 B2 | 1/2016 | Dodgen et al. | |
| 9,239,670 B2 * | 1/2016 | Dewan | G06F 3/04842 |
| 9,256,917 B1 * | 2/2016 | Khafizova | G06F 3/0482 |
| 9,256,969 B2 * | 2/2016 | Krajec | G06T 11/206 |
| 9,275,482 B1 * | 3/2016 | Dannelongue | G06F 19/708 |
| 9,317,963 B2 | 4/2016 | Ruble et al. | |
| 9,323,445 B2 * | 4/2016 | Kritt | G06F 3/0488 |
| 9,342,497 B1 | 5/2016 | Waite | |
| 9,363,149 B1 | 6/2016 | Chauhan et al. | |
| 9,400,973 B2 * | 7/2016 | Tolle | G06Q 10/10 |
| 9,424,333 B1 * | 8/2016 | Bisignani | G06F 17/30592 |
| 9,424,670 B1 | 8/2016 | Jin et al. | |
| 9,443,336 B2 * | 9/2016 | Benson | G06T 11/60 |
| 9,472,002 B1 | 10/2016 | Wong et al. | |
| 9,508,167 B2 | 11/2016 | Kim et al. | |
| 9,513,783 B1 | 12/2016 | Vaidya | |
| 9,513,792 B2 * | 12/2016 | Koshi | G06F 3/0488 |
| 9,535,565 B2 | 1/2017 | Vranjes et al. | |
| 9,552,557 B2 | 1/2017 | Ponomarev et al. | |
| 9,563,674 B2 * | 2/2017 | Hou | G06F 17/30389 |
| 9,600,915 B2 | 3/2017 | Winternitz et al. | |
| 9,665,259 B2 * | 5/2017 | Lee | G06F 3/0486 |
| 9,684,882 B2 * | 6/2017 | Azmoon | G06Q 10/06316 |
| 9,697,627 B2 | 7/2017 | Ruble | |
| 9,716,741 B2 * | 7/2017 | Duncker | H04L 67/02 |
| 9,754,394 B2 | 9/2017 | Matsuo | |
| 9,754,396 B2 * | 9/2017 | Krajec | G06T 11/206 |
| 9,760,262 B2 * | 9/2017 | Drucker | G06F 17/245 |
| 9,870,136 B2 * | 1/2018 | Pourshahid | G06F 3/04847 |
| 9,883,250 B2 * | 1/2018 | Chai | H04N 21/482 |
| 9,952,738 B1 * | 4/2018 | Kumar | G06F 9/44 |
| 9,990,349 B2 * | 6/2018 | Campbell | H04L 43/045 |
| 10,013,783 B1 * | 7/2018 | Bhat | G06T 11/206 |
| 10,049,475 B2 * | 8/2018 | Ruble | G06T 11/206 |
| 10,109,084 B2 * | 10/2018 | Azizi | G06T 11/206 |
| 10,217,241 B2 * | 2/2019 | Rossi | H03M 7/30 |
| 10,222,935 B2 * | 3/2019 | Vedha | G06F 16/24578 |
| 10,275,911 B2 * | 4/2019 | Kim | G06T 11/206 |
| 10,304,225 B2 * | 5/2019 | Allyn | G06T 11/206 |
| 10,311,608 B2 * | 6/2019 | Kirichenko | G06T 11/206 |
| 10,318,624 B1 * | 6/2019 | Rosner | G06F 17/246 |
| 10,347,017 B2 * | 7/2019 | Ruble | G06T 11/206 |
| 10,395,412 B2 * | 8/2019 | Berglund | G06T 11/206 |
| 10,599,764 B2 * | 3/2020 | Campbell | G06K 9/00442 |
| 2002/0191027 A1 * | 12/2002 | Morrow | G06F 3/0481 715/788 |
| 2003/0071814 A1 | 4/2003 | Jou et al. | |
| 2003/0128212 A1 | 7/2003 | Pitkow | |
| 2004/0088656 A1 * | 5/2004 | Washio | G06T 11/60 715/273 |
| 2004/0122601 A1 * | 6/2004 | Shetty | G06T 11/206 702/35 |
| 2004/0174397 A1 * | 9/2004 | Cereghini | G06Q 30/02 715/855 |
| 2004/0174563 A1 * | 9/2004 | Cassidy, Jr. | G06T 11/60 358/1.18 |
| 2004/0243929 A1 | 12/2004 | Jones et al. | |
| 2004/0252136 A1 | 12/2004 | Bhatt et al. | |
| 2005/0162423 A1 * | 7/2005 | Goggin | G06T 11/206 345/440 |
| 2006/0010100 A1 * | 1/2006 | McAvoy | G09B 29/007 |
| 2006/0070013 A1 * | 3/2006 | Vignet | G06F 17/30893 715/854 |
| 2006/0119619 A1 * | 6/2006 | Fagans | G06Q 10/10 345/619 |
| 2006/0136825 A1 * | 6/2006 | Cory | G06T 11/206 715/700 |
| 2006/0284852 A1 * | 12/2006 | Hofmeister | G06F 3/0483 345/173 |
| 2007/0013697 A1 | 1/2007 | Gilboa | |
| 2007/0024909 A1 * | 2/2007 | Hanechak | G06F 17/211 358/1.18 |
| 2007/0101255 A1 | 5/2007 | Garg et al. | |
| 2007/0126731 A1 * | 6/2007 | Sabram | G06T 11/206 345/418 |
| 2007/0126736 A1 * | 6/2007 | Tolle | G06Q 10/10 345/440 |
| 2007/0208992 A1 * | 9/2007 | Koren | G06Q 10/10 715/212 |
| 2008/0036767 A1 * | 2/2008 | Janzen | G06Q 10/10 345/440 |
| 2008/0062175 A1 | 3/2008 | Arya | |
| 2008/0122837 A1 | 5/2008 | Woo et al. | |
| 2008/0178117 A1 | 7/2008 | Gelman et al. | |

(56) References Cited

U.S. PATENT DOCUMENTS

| | | | |
|---|---|---|---|
| 2008/0192056 A1* | 8/2008 | Robertson | G06T 11/206 345/440 |
| 2008/0209354 A1 | 8/2008 | Stanek et al. | |
| 2008/0307369 A1* | 12/2008 | Liu | G06T 11/206 715/855 |
| 2009/0009517 A1 | 1/2009 | Palmer | |
| 2009/0096812 A1 | 4/2009 | Boixel et al. | |
| 2009/0109236 A1 | 4/2009 | Xu et al. | |
| 2009/0199128 A1 | 8/2009 | Matthews et al. | |
| 2009/0327954 A1* | 12/2009 | Danton | G06F 3/0481 715/810 |
| 2010/0005411 A1* | 1/2010 | Duncker | G06F 17/30873 715/769 |
| 2010/0017812 A1 | 1/2010 | Nigam | |
| 2010/0050114 A1* | 2/2010 | Braun | G06F 3/04817 715/788 |
| 2010/0070437 A1* | 3/2010 | Sickenius | G06F 21/84 706/12 |
| 2010/0077328 A1 | 3/2010 | Berg et al. | |
| 2010/0114752 A1* | 5/2010 | Downs | G06Q 40/04 705/37 |
| 2010/0149073 A1 | 6/2010 | Chaum et al. | |
| 2010/0162152 A1* | 6/2010 | Allyn | G06T 11/206 715/767 |
| 2010/0194754 A1* | 8/2010 | Alsbury | G06F 3/017 345/440 |
| 2010/0194778 A1 | 8/2010 | Robertson et al. | |
| 2010/0214300 A1 | 8/2010 | Alsbury et al. | |
| 2010/0231595 A1 | 9/2010 | Dang et al. | |
| 2010/0231606 A1* | 9/2010 | Nelson | G06T 11/206 345/619 |
| 2010/0251151 A1* | 9/2010 | Alsbury | G06F 1/1626 715/765 |
| 2011/0041087 A1 | 2/2011 | Leveille et al. | |
| 2011/0050702 A1* | 3/2011 | Heimendinger | G06T 11/206 345/440 |
| 2011/0060998 A1* | 3/2011 | Schwartz | G06F 16/954 715/738 |
| 2011/0066971 A1 | 3/2011 | Forutanpour et al. | |
| 2011/0074786 A1* | 3/2011 | Aggarwal | G06T 11/206 345/440 |
| 2011/0106589 A1* | 5/2011 | Blomberg | G06Q 10/063 705/7.39 |
| 2011/0115814 A1* | 5/2011 | Heimendinger | G06F 3/04883 345/619 |
| 2011/0129164 A1 | 6/2011 | Lin et al. | |
| 2011/0144970 A1 | 6/2011 | Jiang et al. | |
| 2011/0148914 A1* | 6/2011 | Kim | G06T 11/206 345/619 |
| 2011/0164055 A1 | 7/2011 | Mccullough et al. | |
| 2011/0219321 A1 | 9/2011 | Gonzalez veron et al. | |
| 2011/0283231 A1 | 11/2011 | Richstein et al. | |
| 2011/0302528 A1 | 12/2011 | Starr | |
| 2011/0307529 A1 | 12/2011 | Mukherjee et al. | |
| 2011/0317891 A1 | 12/2011 | Kajimoto et al. | |
| 2012/0005045 A1* | 1/2012 | Baker | G06Q 30/0643 705/27.2 |
| 2012/0023455 A1* | 1/2012 | Chen | G06F 16/248 715/853 |
| 2012/0069024 A1* | 3/2012 | Saund | G06T 11/206 345/440 |
| 2012/0180002 A1 | 7/2012 | Campbell et al. | |
| 2012/0212493 A1* | 8/2012 | Taylor | G06T 11/20 345/440.2 |
| 2012/0218289 A1 | 8/2012 | Rasmussen et al. | |
| 2012/0227000 A1* | 9/2012 | McCoy | G06F 3/0482 715/762 |
| 2012/0254783 A1* | 10/2012 | Pourshahid | G06F 3/04883 715/771 |
| 2012/0272186 A1 | 10/2012 | Kraut | |
| 2012/0306887 A1* | 12/2012 | Mohammad | G06Q 99/00 345/440.2 |
| 2012/0313949 A1* | 12/2012 | Rope | G06T 11/206 345/440 |
| 2013/0024795 A1* | 1/2013 | Robotham | G06F 3/0486 715/769 |
| 2013/0042201 A1 | 2/2013 | Sandman et al. | |
| 2013/0055058 A1 | 2/2013 | Leong et al. | |
| 2013/0055132 A1* | 2/2013 | Foslien | G06F 17/30554 715/771 |
| 2013/0076783 A1 | 3/2013 | Goto et al. | |
| 2013/0080444 A1* | 3/2013 | Wakefield | G06F 17/30994 707/748 |
| 2013/0097544 A1 | 4/2013 | Parker et al. | |
| 2013/0127915 A1 | 5/2013 | Gilra | |
| 2013/0152001 A1 | 6/2013 | Lovitt et al. | |
| 2013/0187948 A1* | 7/2013 | Yoshimoto | G06F 3/04883 345/629 |
| 2013/0194274 A1 | 8/2013 | Ishihara | |
| 2013/0232431 A1 | 9/2013 | Hipsher | |
| 2013/0311920 A1* | 11/2013 | Koo | G06F 3/04883 715/765 |
| 2013/0332862 A1* | 12/2013 | Mirra | G06Q 40/06 715/760 |
| 2013/0342541 A1* | 12/2013 | Taylor | G06T 11/20 345/440 |
| 2014/0028227 A1 | 1/2014 | Yasuda et al. | |
| 2014/0039842 A1* | 2/2014 | Yuen | A61B 5/6838 702/189 |
| 2014/0040009 A1* | 2/2014 | Shi | G06Q 30/0242 705/14.42 |
| 2014/0043325 A1 | 2/2014 | Ruble et al. | |
| 2014/0043331 A1* | 2/2014 | Makinen | G06T 15/40 345/424 |
| 2014/0055459 A1* | 2/2014 | Hiramatsu | G06T 11/206 345/440 |
| 2014/0132609 A1* | 5/2014 | Garg | G06F 16/904 345/440 |
| 2014/0143724 A1* | 5/2014 | Picard | G06T 11/206 715/828 |
| 2014/0146394 A1 | 5/2014 | Tout et al. | |
| 2014/0149931 A1* | 5/2014 | Miki | G06F 9/451 715/803 |
| 2014/0160131 A1* | 6/2014 | Azizi | G06T 11/206 345/440 |
| 2014/0168272 A1* | 6/2014 | Chedeau | G06Q 50/01 345/660 |
| 2014/0176555 A1* | 6/2014 | Kuo | G06T 11/206 345/440 |
| 2014/0210827 A1 | 7/2014 | Alsbury et al. | |
| 2014/0247268 A1 | 9/2014 | Drucker et al. | |
| 2014/0266990 A1 | 9/2014 | Makino et al. | |
| 2014/0267290 A1* | 9/2014 | Hao | G06T 11/206 345/440 |
| 2014/0282124 A1* | 9/2014 | Grealish | G06T 11/206 715/762 |
| 2014/0282145 A1* | 9/2014 | Dewan | G06F 3/04842 715/765 |
| 2014/0282147 A1* | 9/2014 | Kim | G06F 3/0484 715/765 |
| 2014/0282276 A1* | 9/2014 | Drucker | G06F 17/245 715/863 |
| 2014/0300603 A1* | 10/2014 | Greenfield | G06T 11/206 345/440 |
| 2014/0310646 A1 | 10/2014 | Vranjes et al. | |
| 2014/0340407 A1* | 11/2014 | Perez | G06T 11/206 345/440.2 |
| 2014/0351722 A1* | 11/2014 | Frederickson | G06F 3/0481 715/761 |
| 2014/0351728 A1* | 11/2014 | Seo | H04M 1/72569 715/766 |
| 2014/0354650 A1* | 12/2014 | Singh | G06T 11/206 345/440 |
| 2014/0362087 A1 | 12/2014 | Irani et al. | |
| 2014/0362108 A1 | 12/2014 | Aguera-Arcas | |
| 2014/0365954 A1* | 12/2014 | Yoshizawa | G06F 3/0485 715/784 |

(56) References Cited

U.S. PATENT DOCUMENTS

| | | | |
|---|---|---|---|
| 2015/0015504 A1* | 1/2015 | Lee | G06F 3/04845 345/173 |
| 2015/0027708 A1 | 1/2015 | Honekamp | |
| 2015/0029213 A1* | 1/2015 | Benson | G06T 11/206 345/625 |
| 2015/0067568 A1* | 3/2015 | Lee | G06F 3/04842 715/771 |
| 2015/0088783 A1* | 3/2015 | Mun | G06Q 40/06 705/36 R |
| 2015/0135113 A1* | 5/2015 | Sekharan | G06F 3/0488 715/771 |
| 2015/0170384 A1 | 6/2015 | Matsumoto et al. | |
| 2015/0178963 A1* | 6/2015 | Lu | G06T 11/206 345/440 |
| 2015/0186997 A1* | 7/2015 | Singer | G06Q 40/04 705/37 |
| 2015/0193094 A1* | 7/2015 | Armitage | G06F 16/904 715/825 |
| 2015/0207833 A1 | 7/2015 | Tsubotani et al. | |
| 2015/0237085 A1* | 8/2015 | Duncker | H04L 67/02 715/753 |
| 2015/0254369 A1* | 9/2015 | Hou | G06F 3/0486 707/798 |
| 2015/0261392 A1 | 9/2015 | Son | |
| 2015/0261728 A1* | 9/2015 | Davis | G06F 17/218 715/234 |
| 2015/0262396 A1* | 9/2015 | Devarajan | G06F 17/30554 345/440.1 |
| 2015/0277708 A1* | 10/2015 | Rodrig | G06F 3/04847 715/777 |
| 2015/0294488 A1* | 10/2015 | Iwasaki | G06T 11/206 345/440 |
| 2015/0302051 A1 | 10/2015 | Baumgartner et al. | |
| 2015/0331549 A1* | 11/2015 | Legris | G06F 3/0481 715/798 |
| 2016/0055232 A1* | 2/2016 | Yang | G06T 11/206 707/740 |
| 2016/0070430 A1* | 3/2016 | Kim | G06F 16/26 715/769 |
| 2016/0078127 A1 | 3/2016 | Bhat et al. | |
| 2016/0085309 A1* | 3/2016 | Ho | G06F 16/9038 345/666 |
| 2016/0092084 A1* | 3/2016 | Dyar | G06F 3/0481 715/765 |
| 2016/0098187 A1 | 4/2016 | Kim et al. | |
| 2016/0103581 A1* | 4/2016 | Kim | G06F 3/0482 715/711 |
| 2016/0110812 A1* | 4/2016 | Mun | G06Q 40/06 705/36 R |
| 2016/0124587 A1* | 5/2016 | Covington | G06F 3/0482 345/440 |
| 2016/0124605 A1 | 5/2016 | Covington et al. | |
| 2016/0124612 A1 | 5/2016 | Covington et al. | |
| 2016/0124635 A1 | 5/2016 | Covington et al. | |
| 2016/0132225 A1* | 5/2016 | Lee | G06F 17/212 715/731 |
| 2016/0162165 A1* | 6/2016 | Lingappa | G06T 11/206 715/771 |
| 2016/0180555 A1 | 6/2016 | Matsuo | |
| 2016/0180556 A1* | 6/2016 | Deng | G06T 11/206 345/440 |
| 2016/0188185 A1* | 6/2016 | Bous | G06T 11/206 715/202 |
| 2016/0231900 A1 | 8/2016 | Meaney et al. | |
| 2016/0267056 A1* | 9/2016 | Hertzog | G06F 3/04842 |
| 2016/0275144 A1* | 9/2016 | Herman | G06F 17/30696 |
| 2016/0275661 A1* | 9/2016 | Goard | G06T 11/206 |
| 2016/0284109 A1* | 9/2016 | Nishimura | G06T 11/206 |
| 2016/0307344 A1* | 10/2016 | Monnier | G06T 11/206 |
| 2016/0307355 A1* | 10/2016 | Breedvelt-Schouten | G06T 13/80 |
| 2016/0337205 A1 | 11/2016 | Nagahama et al. | |
| 2016/0343154 A1* | 11/2016 | Stewart | G06F 40/18 |
| 2016/0350950 A1* | 12/2016 | Ritchie | G06T 11/206 |
| 2016/0364770 A1* | 12/2016 | Denton | G06Q 30/0277 |
| 2017/0004638 A1* | 1/2017 | Csenteri | G06T 11/206 |
| 2017/0010792 A1* | 1/2017 | Stewart | G06F 3/04845 |
| 2017/0069118 A1* | 3/2017 | Stewart | G06T 11/206 |
| 2017/0076471 A1 | 3/2017 | Prophete et al. | |
| 2017/0091967 A1 | 3/2017 | Roepke | |
| 2017/0091968 A1* | 3/2017 | George | G06T 11/206 |
| 2017/0102866 A1* | 4/2017 | Calvillo | G06F 3/04847 |
| 2017/0109862 A1* | 4/2017 | Barry | G06T 3/40 |
| 2017/0109907 A1 | 4/2017 | Hamedani | |
| 2017/0123639 A1 | 5/2017 | Kennedy | |
| 2017/0124048 A1* | 5/2017 | Campbell | G06F 17/212 |
| 2017/0124740 A1* | 5/2017 | Campbell | G06F 40/18 |
| 2017/0124761 A1 | 5/2017 | Michel et al. | |
| 2017/0126772 A1* | 5/2017 | Campbell | G06F 17/212 |
| 2017/0132582 A1* | 5/2017 | Sakairi | G06Q 10/30 |
| 2017/0139894 A1 | 5/2017 | Welch | |
| 2017/0140395 A1 | 5/2017 | Doi | |
| 2017/0161926 A1* | 6/2017 | Shetty | G06T 11/206 |
| 2017/0168993 A1* | 6/2017 | Prakash | G06T 11/206 |
| 2017/0169592 A1* | 6/2017 | Ruble | G06F 3/04845 |
| 2017/0178368 A1* | 6/2017 | Noon | G06F 16/24568 |
| 2017/0200294 A1 | 7/2017 | Hirano | |
| 2017/0206684 A1* | 7/2017 | Duncker | G06T 11/206 |
| 2017/0212944 A1* | 7/2017 | Hellman | G06Q 10/00 |
| 2017/0221242 A1 | 8/2017 | Street | |
| 2017/0236312 A1* | 8/2017 | Ruble | G06F 9/451 345/440 |
| 2017/0255686 A1 | 9/2017 | Ross | |
| 2017/0262165 A9* | 9/2017 | Calvillo | G06F 3/0481 |
| 2017/0287179 A1* | 10/2017 | Tibshirani | G06T 11/206 |
| 2017/0309046 A1* | 10/2017 | Demiralp | G06F 3/04842 |
| 2017/0323028 A1* | 11/2017 | Jonker | G06F 16/9024 |
| 2017/0351713 A1* | 12/2017 | Chamberlain | G06F 16/951 |
| 2017/0358112 A1* | 12/2017 | Peters | G06F 3/0482 |
| 2017/0364237 A1* | 12/2017 | Zheng | G06F 3/04817 |
| 2017/0365071 A1* | 12/2017 | Rossi | G06T 9/20 |
| 2018/0005418 A1* | 1/2018 | Kim | G06T 11/206 |
| 2018/0025035 A1* | 1/2018 | Xia | G06F 17/30318 |
| 2018/0025073 A1* | 1/2018 | Singh | G06F 17/30601 |
| 2018/0025517 A1* | 1/2018 | Grealish | G06T 11/206 |
| 2018/0052597 A1* | 2/2018 | Stokes | G06T 11/206 |
| 2018/0067625 A1* | 3/2018 | Kim | G06F 16/904 |
| 2018/0128636 A1* | 5/2018 | Zhou | G01C 21/20 |
| 2018/0150981 A1* | 5/2018 | Schneider | G06T 11/206 |
| 2018/0165844 A1 | 6/2018 | Kirichenko et al. | |
| 2018/0189243 A1* | 7/2018 | Allyn | G06T 11/206 |
| 2018/0189988 A1* | 7/2018 | Allyn | G06T 11/206 |
| 2018/0190000 A1* | 7/2018 | Berglund | G06T 13/80 |
| 2018/0254095 A1* | 9/2018 | Blick | G06Q 50/24 |
| 2018/0268577 A1* | 9/2018 | Neves | G06T 11/206 |
| 2018/0300914 A1* | 10/2018 | Mikhailov | G06T 11/206 |
| 2018/0335937 A1* | 11/2018 | Hauenstein | G06F 3/016 |
| 2018/0341839 A1 | 11/2018 | Malak et al. | |
| 2018/0350116 A1* | 12/2018 | Ruble | G06F 3/04845 |
| 2019/0012342 A1* | 1/2019 | Cohn | G06F 11/30 |
| 2019/0065014 A1* | 2/2019 | Richter | G06F 9/451 |
| 2019/0114308 A1* | 4/2019 | Hancock | G06F 17/212 |
| 2019/0125278 A1* | 5/2019 | Soosalu | A61B 5/0022 |
| 2019/0213763 A1* | 7/2019 | Geller | G06F 16/9024 |
| 2019/0258709 A1* | 8/2019 | Campbell | G06F 3/04817 |
| 2019/0391707 A1* | 12/2019 | Ristow | G06F 3/0482 |

OTHER PUBLICATIONS

Kunz, Gion., "Chartist.js, an Open-Source Library for Responsive Charts", Published on: Dec. 16, 2014 Available at: http://www.smashingmagazine.com/2014/12/chartist-js-open-source-library-responsive-charts/.

"Making charts and maps responsive", Published on: Jan. 23, 2015 Available at: http://www.amcharts.com/tutorials/making-charts-responsive/.

Amigo, Chris., "DavaViz for Everyone: Responsive Maps with D3", Published on: Aug. 26, 2013 Available at: http://eyeseast.github.io/visible-data/2013/08/26/responsive-d3/.

(56) References Cited

OTHER PUBLICATIONS

"Introducing responsive charts and maps", Published on: Jan. 26, 2015 Available at: http://www.amcharts.com/blog/responsive-charts/.
Sikkema, Albert., "Responsive charts using CSS media queries", Published on: Dec. 4, 2012 Available at: http://forum.highcharts.com/highcharts-usage/responsive-charts-using-css-media-queries-t22558/.
"Smart Charts", Retrieved on: Oct. 7, 2015 Available at: https://codeontime.com/learn/touch-ui/charts/smart-charts.
"Zing chart", Retrieved on: Oct. 7, 2015 Available at: http://www.zingchart.com/features/responsive-charts/.
Rigdon, Sarah., "Print vs. Web, Static vs. Interactive", Retrieved on: Oct. 7, 2015 Available at: https://infoactive.co/data-design/ch16.html.
"Responsive Web Design concepts", Published on: Apr. 15, 2015 Available at: http://docs.telerik.com/kendo-u/using-kendo-in-responsive-web-pages.
Acampora, Jon., "How to Make Your Excel Dashboards Resize for Different Screen Sizes", Published on: Jul. 20, 2015 Available at: http://www.excelcampus.com/vba/resize-dashboards-for-screen-sizes/.
Potschien, Denis., "Chartist.js Creates Responsive, Animated Charts with SVG", Published on: Jun. 12, 2015 Available at: http://www.noupe.com/design/chartist-js-creates-responsive-animated-charts-with-svg-88363.html.
"Responsive Graph Presentation", IP.com Journal, IP.com Inc., West Henrietta, NY, US, Dec. 27, 2013.
Pengfei Xu et al: "GACA", Human Factors in computing Systems, ACM, 2 Penn Plaza, Suite 701 New York NY 10121-0701 USA, Apr. 18, 2015, pp. 2787-2795.
Cameron McCormack et al: "Authoring Adaptive Diagrams", Document Engineering, ACM, 2 Penn Plaza, Suite 701 New York NY 10121-0701 USA, Sep. 16, 2008, pp. 154-163.
Kim Marriott et al: "Fast and efficient client-side adaptivity for SVG", Proceedings of the 11th International Conference on World Wide Web, ACM, Honolulu, Hawaii, USA, May 7, 2002, pp. 496-507.
Yingcai Wu et al: "ViSizer: A Visualization Resizing Framework", IEEE Transactions on Visualization and Computer Graphics, IEEE Service Center, Los Alamitos, CA, US, vol. 19, No. 2, Feb. 2013, pp. 278-290.
International Search Report and Written Opinion issued in Published PCT Application No. PCTUS2017-016667 dated Jun. 22, 2016.
International Search Report and the Written Opinion issued in PCT Patent Application No. PCT/US2017/016751 dated Jun. 29, 2017.
International Search Report and the Written Opinion issuec in PCT Application No. PCT/US2016/065033 dated Mar. 1, 2017.
Christopher, "Some simple tricks for creating responsive charts with D3", Published Nov. 23, 2015. Retrieved from <<http://blog/webkid/io/responsive-chart-usability-d3/#Prevent_overlapping_of_x-axis_labels>>.
Office Action dated Feb. 21, 2017 cited in U.S. Appl. No. 14/967,911.
Office Action dated Aug. 24, 2017 cited in U.S. Appl. No. 14/967,911.
2nd Written Opinion issued in Published PCT Application No. PCT/US2016/065033, dated Oct. 24, 2017.
Office Action dated Oct. 18, 2017 cited in U.S. Appl. No. 15/043,176.
"Introducing Amazon QuickSight—YouTube", Retrieved from: https://www.youtube.com/watch?v=Tj0gW4XI6vU, Feb. 25, 2019, 2 Pages.
"Notice of Allowance Issued in U.S. Appl. No. 15/043,176", dated Feb. 27, 2019, 18 Pages.
"Non Final Office Action Issued in U.S. Appl. No. 16/059,167", dated Sep. 6, 2019, 11 Pages.

* cited by examiner

TAGGING UTILIZATIONS FOR SELECTIVELY PRESERVING CHART ELEMENTS DURING VISUALIZATION OPTIMIZATIONS

There are many types of chart visualizations that can be used to represent data, including graphs, plots, maps, tables and other types of charts. It is common for these chart visualizations to include labels, legends, titles, gridlines, and other textual and graphical elements to help identify, describe, quantify and/or otherwise reflect the relative relationships between the underlying data.

To improve the readability and visual appearance of a chart visualization, the chart elements are appropriately sized and arranged for display on the intended target displays. For instance, a chart that is rendered on a desktop monitor will often be configured with larger fonts and, sometimes, with more chart elements than when the same chart is configured for presentation on smaller handheld devices.

Some software applications, including Microsoft's Excel®, are specifically configured to adjust the display attributes of a chart in response to the resizing of the chart. For instance, when a chart is initially created in Excel®, the default size of the chart can be 600 pixels wide by 360 pixels tall (e.g., 5"×3"). The elements of the chart (e.g., legend, title, etc.) are laid out within the chart based on this default size for preferred readability and aesthetics. When the chart is subsequently reduced in size, due to user input and/or in response to displaying the chart on a different device, the chart elements can also be scaled accordingly and/or repositioned within the chart, manually or automatically.

Existing systems that apply automatic scaling and repositioning of chart elements, however, are somewhat restrictive and do not provide sufficient user controls over the manner in which chart elements are selected for modification and/or the manner in which those modifications are made. For instance, existing systems do not enable a user to identify which chart elements will be retained and/or deleted during automatic chart optimizations, nor which display attributes will be modified.

In some instances, the automatic modifications made to chart elements during an automatic 'optimization' will actually degrade the overall usefulness of the chart, particularly when critical elements are dropped from the chart and/or the display attributes of those critical elements are modified undesirably. For example, reducing font sizes of some element can render the elements unreadable. Likewise, repositioning of chart elements can also create obstructing overlaps, misalignments and other situations that effectively render corresponding data indefinite.

Accordingly, there is an ongoing need for improved systems and methods for managing chart visualizations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided for facilitating tagging of chart elements and for optimizing chart visualizations and, even more particularly, to providing enhanced user control over selection of chart elements and display attributes that are selectively preserved during chart visualization optimizations.

In some embodiments, a computing system accesses a chart visualization that includes a plurality of different chart elements having display attributes that are modifiable during resizing of the chart visualization. The computing system detects input that tags a particular one of the chart elements to be selectively preserved during modification of the chart visualization and which, even more specifically, identifies and/or selects a particular display attribute of the chart element to be preserved during the resizing or other modification of the chart visualization.

Thereafter, input is received for modifying the chart visualization which affects visualization of at least some of the chart elements and that would have otherwise affected the particular tagged chart element and/or the particular display attribute of the chart element absent the tagging input. The modifications performed to the chart visualization, according to some embodiments, include any combination of resizing, repositioning, removing, hiding and/or changing a transparency of untagged chart element(s), while simultaneously and selectively preserving the particular display attributes of the chart element that was tagged, based upon that chart element being tagged. In some instances, absent the tagging input, the particular chart element would be eliminated or would become visibly obscured from the chart visualization during the visualization optimization. In other instances, particular display attribute of the particular chart element would have been modified during the visualization optimization, absent the tagging input, in such a way as to reduce visibility and/or readability of the particular chart element.

According to some embodiments, the preserving of the particular display attribute(s) of tagged chart element(s) includes refraining from modifying the tagged element(s) or modifying the tagged element(s) in such a way as to preserve at least one display attribute of the tagged element(s).

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Figure 1:
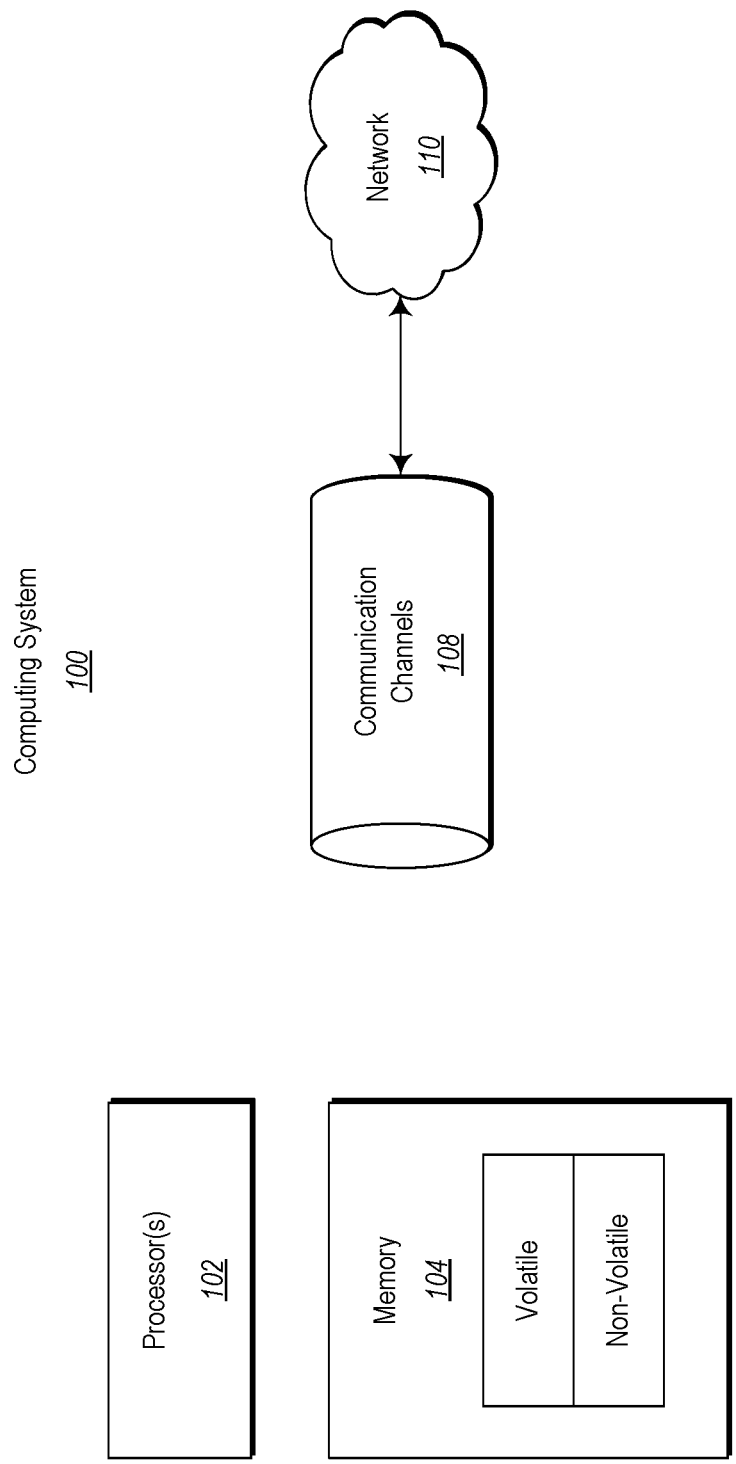
FIG. 1 illustrates an embodiment of a computing system which is usable to implement aspects of the disclosed embodiments.

Aspects of the disclosed embodiments generally relate to the optimizing of chart visualizations and, even more particularly, to methods, systems and storage devices that utilize tagging of chart elements and for selectively preserving particular display attributes for the tagged chart elements during chart visualization optimizations.

Some of the disclosed embodiments include a computing system executing stored computer-executable instructions with one or more processors of the computing system in order to perform a method of utilizing tagging of chart elements and for selectively preserving particular display attributes of the tagged chart elements during chart visualization optimizations.

This disclosed method includes the computing system accessing a chart visualization that includes a plurality of different chart elements that each have display attributes that are modifiable during optimization of the chart visualization. The optimization applied to the chart visualization may include any modification made to the chart, such as resizing of the chart and altering, replacing, moving and/or removing chart elements.

The computing system also detects tagging input that tags at least one chart element and that is operable to identify at least one display attribute for the tagged chart element to be preserved during optimization of the chart visualization. Then, when the computing system detects chart modification input that is operable to initiate an optimization of the chart visualization, the computing system selectively modifies one or more untagged elements while performing the optimization of the chart visualization and while preserving the identified display attribute of the particular chart element that was tagged. Notably, this can enhance user control and improve the overall user experience with charting applications by at least enabling a user some control over the preservation of display attributes and chart elements in such a manner which was not previously possible.

In at least this regard, there are various technical effects and benefits that can be achieved by implementing aspects of the disclosed embodiments. By way of further example, the disclosed embodiments can be used to provide enhanced user controls for managing enhanced control over the readability, aesthetic appeal and/or functionality of charts and their corresponding textual and/or graphical elements, particularly during resizing and other modifications and optimizations of charts visualizations.

The technical effects related to the disclosed embodiments also include improved user convenience and efficiency gains through a reduction in steps required by a user to make chart modifications after a chart is resized. For example, and even more particularly, the technical effects include efficiency gains through a reduction in processing overhead required for receiving and processing multiple manually user inputs for reversing, correcting or otherwise adjusting undesired chart modifications.

Various methods, computing systems and storage devices will now be described with reference to the disclosed embodiments for utilizing tagging of chart elements and for selectively preserving particular display attributes for tagged chart elements during chart visualization optimizations.

Computing Environment

In this description and in the claims, the term "computing system" is defined broadly as including any device or system (or combination thereof) that includes at least one physical and tangible processor, and a physical and tangible memory capable of having thereon computer-executable instructions that may be executed by the processor.

As illustrated in FIG. 1, in its most basic configuration, the computing system 100 includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100.

Figure 3:
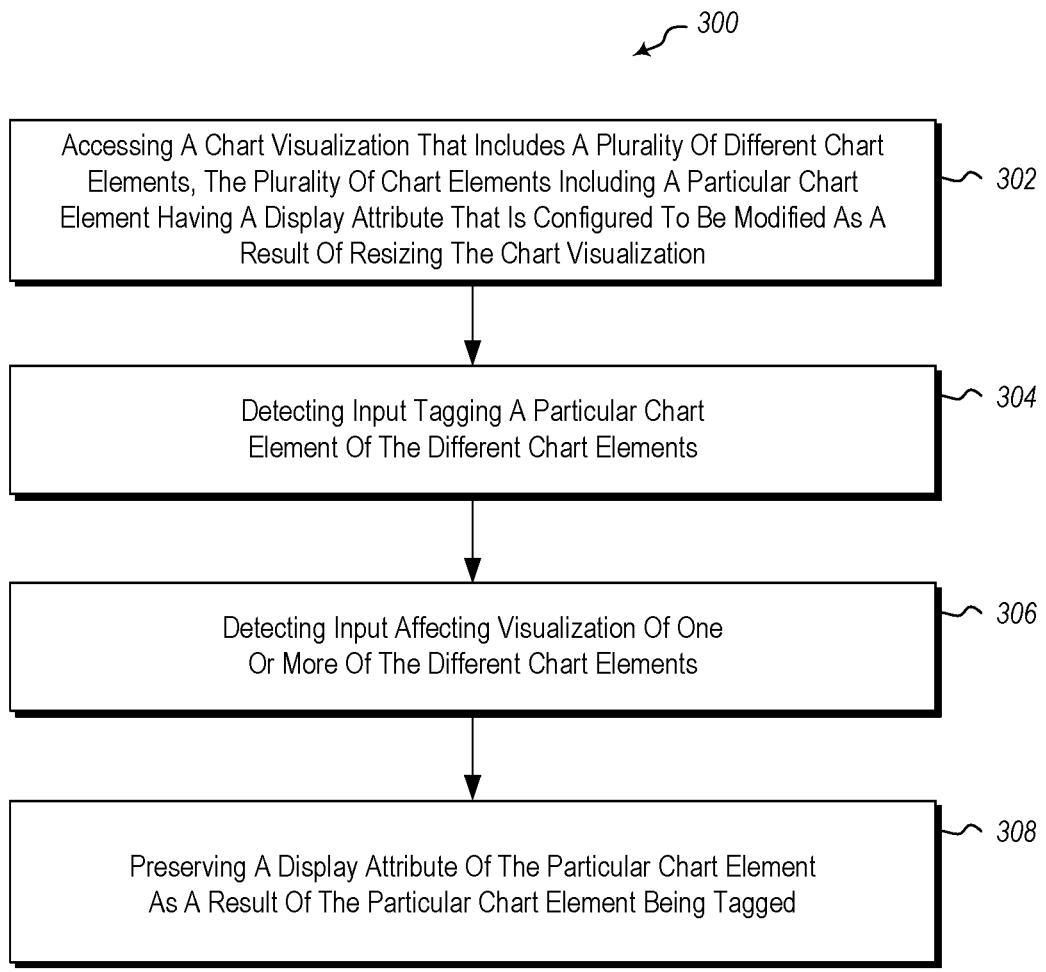
FIG. 3 illustrates a flowchart of at least one method for utilizing controls to selectively preserve display attributes of chart elements while optimizing chart visualizations.

The computer-executable instructions may be used to implement and/or instantiate all of the functionality disclosed herein, including, but not limited to the functionality that is disclosed in reference to the flow diagram of FIG. 3.

Computing system 100 may also contain communication channels 108 that allow the computing system 100 to communicate with other message processors over, for example, network 110.

Embodiments described herein may comprise or utilize special-purpose or general-purpose computer system components that include computer hardware, such as, for example, one or more processors and system memory. The system memory may be included within the overall memory 104. The system memory may also be referred to as "main memory," and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors 102 of the computing system 100 perform the acts and direct the operation of the computing system 100 in response to having executed the stored computer-executable instructions defined by the software. Various input and output devices, not illustrated, can be used by the computing system to receive user input and to display output in accordance with the computer-executable instructions.

Various methods for implementing the disclosed embodiments with a computing system, like computing system 100, will now be described, along with a description of chart visualizations and modifications that can be made to a chart visualization.

Resizing of Chart Visualizations

Figure 2:
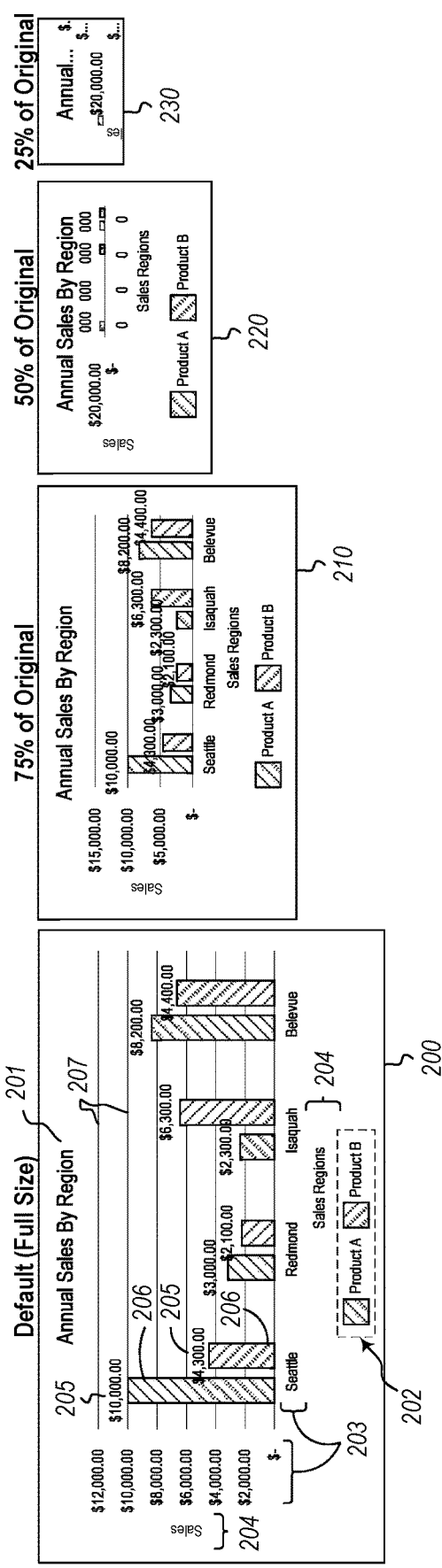
FIG. 2 illustrates a set of chart visualizations having different sizes and configurations.

FIG. 2 illustrates a plurality of chart visualizations (200, 210, 220 and 230) that correspond to underlying data. In the present example, the underlying data comprises sales data and the chart visualizations reflect annual sales by regions.

The first chart visualization 200 is rendered at a default size. In this default size, various chart elements are presented, including a title 201, a legend 202, data labels 203, axis labels 204, in-chart labels 205, graphical data objects 205, and gridlines 207.

Chart visualization 210 is based on the same underlying data as chart visualization 200, but fewer chart elements are presented in the second visualization. Furthermore, the font size and position of some of the chart elements have also been changed. This is done, according to some implementations, to improve readability of the chart visualization 210 at the reduced size which, in this case, is at a 25% reduction of the original default size, such that it is now rendered at 75% of the original size. Similarly, a reduction of the original chart visualization 200 by 50% is shown by chart visualization 220, which includes even fewer chart elements. Finally, chart visualization 230 reflects a 75% size reduction of the original size, such that it is now rendered at 25% of the original size, and which includes yet even fewer chart elements. In some instances, the chart elements are replaced by new chart elements to facilitate the readability of chart (e.g., adding labels $15,000.00 to chart visualization 210 and by adding label $20,000.00 to chart visualizations 220 and 230).

Despite the foregoing modifications, whether performed manually or automatically, it may still be difficult, sometimes, to read all of the text that is presented within the labels, depending on the size of the text, the amount of overlap and the variance in contrast between the overlapping elements and the other display attributes of the chart elements (as shown). The aesthetic appeal of the chart may also be affected in a negative way, depending on when the foregoing changes are made or not made, as well as how they are made. Furthermore, in some instances, the modifications that are made to a chart that are not desired by the user. For instance, a user may not want certain elements to be dropped from the chart, including particular labels, values, images or other elements that the user deems critical to the interpretation, usability, appeal or other functionality of the chart.

Tagging of Chart Elements

To help address at least some of the foregoing problems, embodiments of this disclosure may be utilized to further improve the optimization of chart visualizations by utilizing tagging of chart elements to provide a level of enhanced user control over the manner in which particular display attributes for certain chart elements are selectively preserved during modification of the chart visualizations.

In some embodiments, a modification to a chart (sometimes referred to herein as a chart optimization) may occur automatically and/or manually in response to detecting a triggering event (e.g., in response to a resizing of the chart, an overlap of chart elements, an obstruction to one or more chart elements, and so forth). The resulting chart optimization or chart modification includes any combination of repositioning chart elements, temporarily removing or permanently removing chart elements, replacing chart elements and/or changing display attributes of the chart elements (e.g., size, font, transparency, contrast, coloring, etc.).

According to some embodiments, the chart modifications are selectively controlled, at least in part, based on a determination of whether the chart elements have been tagged and/or one or more display attributes of the chart elements have been identified to be preserved during the chart optimizations.

Various examples of methods for utilizing tagging chart elements and for selectively preserving particular display attributes of tagged chart elements during chart visualization optimizations will now be described in more detail with reference to the methods associated with the flowchart of FIG. 3 and chart visualizations 4-17.

The flowchart 300 of FIG. 3, for instance, illustrates a method that starts with a computing system accessing a chart visualization that includes a plurality of different chart elements (act 302).

The accessed chart visualization can comprise any chart type, including, but not limited to, one or more bar charts, bubble charts, pie charts, line charts, column charts, area charts, scatter plots, combo charts, doughnut charts, surface charts, radar charts, histogram charts, pareto charts, waterfall charts, box & whisker charts, treemap charts, sunburst charts, funnel charts, or other charts, plots or graphs, maps, tables or other chart visualizations that reflect relationships between data aggregations or any other types of underlying data.

The chart elements referred to by this disclosure include one or more textual elements and/or graphical elements. The textual elements include any combination of number, character and/or symbol. Graphical elements include any combination of one or more axis lines, grid lines, tick marks, lines, bars, wedges, circles, squares, dots, or any other shapes, icons, pictures, animations or any other graphical elements.

Each of the different chart elements have one or more corresponding display attributes, including one or more coloring, contrast, brightness, size, font type, thickness, shading, orientation, tapering, transparency, position or other display attribute. These display attributes include any combination of default attributes or user defined attributes that are stored in and accessible through data structures stored in the system memory. The display attributes also include any combination of one or more value, label, graphical object and/or other rendered component associated with the corresponding chart element(s).

The display attributes for particular chart elements are, according to some embodiments, modifiable during optimizations of the chart visualizations. In some embodiments, the chart visualization also includes general chart display attributes similar to the display attributes of individual chart elements, including attributes associated with scaling, size, color, font, visibility, etc., all of which are also modifiable.

As further reflected by the flow chart 300 of FIG. 3, the computing system detects tagging input that tags at least one chart element (act 304). The act of detecting tagging input (act 304) includes detecting input that implicitly or explicitly identifies at least one display attribute for the tagged chart element to be preserved during optimization of the chart visualization. For instance, the tagging input implicitly or explicitly identifies a value, label, graphical object and/or any of the other component of a chart element to be preserved, as well as the other display attributes to be preserved for the tagged chart element (e.g., font size, coloring, transparency, contrast, position, existence, full version vs. abbreviated version, etc.).

In some instances, a set of display attributes are maintained as a default set of display attributes to be preserved for a tagged chart element whenever that chart element is tagged. In some instances, the default set of attributes includes a value or label for a chart element to be preserved. Alternatively, or additionally, the default set of attributes includes a font size or color, a visibility, and/or position of an element or any other display attribute or combination of display attributes for one or more corresponding chart element.

In some instances, the default set of display attributes is maintained in a table or other data structure that is stored by and/or accessible to and readable by the computing system. The computing system references this data structure during chart optimizations to identify which chart elements and/or display attributes to modify or not, based on whether the corresponding chart elements have been tagged.

In some instances, the default set of display attributes is maintained as a hierarchical set of attributes to be selectively applied in different circumstances. For instance, when a first set of circumstances is detected (e.g., when a chart is reduced in size by a certain magnitude or percentage, when a threshold amount of overlap occurs for chart element(s) and/or any other condition occurs) then the first default set of display attributes will be preserved and applied for the corresponding tagged element. Then, when a different set of circumstances occurs (e.g., a different magnitude or percentage in size reduction or overlapping occurs, etc.) a different default set of default display attributes will be preserved and applied for the corresponding tagged elements, and while similar display attributes will not be preserved for untagged elements.

By way of an example, for a first detected circumstance, both the label size and position for a tagged element will be selectively preserved during a chart optimization, based on a first default display attribute setting, while changing the size, position, or existence of similar labels for untagged elements. In this example, the selective preservation of particular display attributes for tagged elements is based on which chart elements are tagged and based on which circumstances have occurred. Then, when a different set of circumstances is detected, the selective preservation of display attributes may include preserving the size and/or existence of the tagged element, even though the position of the label may now be changed due to the detection of the second set of circumstances (based on a second default display attribute setting). Nonetheless, because the chart element was tagged, at least one of the display attributes for that element will be preserved (e.g., the size or existence of the label), while the same attributes are not maintained for similar but untagged elements that are ultimately removed from the chart and/or reduced in size according to this example.

When a chart element is a label or value, the different default sets of display attributes may include specific abbreviations that are determined to be suitable alternatives that preserve an intended meaning of the original chart elements. For instance, the label "United States" for a tagged element may be preserved by using the abbreviation "U.S." and "US," when specified as such by the default set of display attributes.

In some instances, the display attributes that are defined and stored as the display attributes to be preserved for specific chart elements are user modifiable, based on user input received at one or more input fields that are operable to define and/or modify the default set of stored display attributes. In some instances, these input fields are displayed as menus or other interface objects that are rendered in response to a user selecting a chart element from the chart and/or through directory menus accessible through an application interface control ribbon (not presently shown).

At some point in time, the computing system detects input that is operable to cause a modification to the chart visualization that affects visualization of one or more of the chart elements (act 306). Despite this modification, the default/defined set of display attributes for the tagged chart element(s) will be preserved during the modification as a result of the particular chart element(s) being tagged (act 308).

In some instances, the default/defined display attribute(s) for tagged elements would not be preserved during the modification absent the tagging of the chart element(s). The preservation of the display attribute(s) also occurs, according to some embodiments, for the tagged chart element at the same time corresponding display attribute(s) are changed and not preserved for similar chart elements that are untagged. For instance, the display of a particular label or value for a first series (which is tagged) in a chart may be preserved while a similar label or value for a second series (which is untagged) in the chart is removed/moved or otherwise modified.

Triggering Events for Modifying Chart Visualizations

Some specific examples for triggering events that comprise input affecting visualizations (act 306) will now be provided. In one instance, a triggering event includes determining that the chart visualization is to be rendered on a display device having particular size constraints that require resizing of the chart visualization from an initial size. This determination/instruction can be, for instance, an input that causes resizing (e.g., zooming in or out) within a chart viewport and/or the resizing of a viewport relative to an interface/browser layout viewport in which the chart viewport is presented.

In some instances, the triggering events include detecting an overlap that is about to occur, prior to actually rendering the visualization by a graphics card of the computing system and/or the presentation of the chart visualization on a system display screen.

In some embodiments, the triggering events include detecting an actual overlap that has occurred for a chart visualization that is rendered to a user on a display device with other display objects, by analyzing a resized chart visualization simultaneously to or after it is being processed for display, with an analysis of other potentially displayed objects.

In some embodiments, the triggering events include detecting that the overlap is occurring within the chart by one or more predetermined chart elements. These predetermined chart elements can include any combination of one or more textual or graphical elements (e.g., one or more legend, title, label, value, a largest element, a smallest element, multiple textual chart elements, multiple graphical chart elements, chart elements that are within a predetermined visibility threshold based on contrasts or transparencies, elements having particular coloring, elements having particular shading, elements having particular sizes, fonts, shapes, or other display attributes).

In some instances, the triggering events include detecting that the overlap exceeds a predetermined threshold amount, such as a predetermined percentage of one of the elements (e.g., X % of total area of the element(s)) is overlapped and/or a predetermined magnitude of the element(s) is overlapped (e.g., a predetermined number of pixels, characters, quantity of elements, or other magnitude of detectable overlap).

In some instances, the triggering events also include the changing of a display attribute without actually increasing or otherwise changing an amount of overlap that already existed. For instance, two elements may already be overlapping and their transparencies, relative contrasts, coloring, or other display attributes may be within a predetermined tolerance of visibility (as defined by one or more stored tolerance values), such that a triggering event does not initially exist. However, a change to one of the display attributes of one or more of the chart elements may be sufficient to cause a triggering event when the change results in the transparencies, relative contrasts, coloring, or other display attributes to fall outside of a predetermined tolerance of visibility for overlapping elements.

In some embodiments, the trigger event includes a combination of two or more of the foregoing triggering events, for two, three or any other quantity of overlapping chart elements.

The process for detecting the triggering events, includes, according to some embodiments, referencing tables and other data structures that specify the relative or fixed placements of the different chart elements and/or their corresponding display attributes. In some embodiments, the processes for detecting the triggering events includes, additionally, or alternatively, intercepting or otherwise accessing data sent to or received from the graphics card on the computing system or application interface(s) (e.g., spreadsheet table) processing the chart visualizations.

In some embodiments, the settings for controlling what qualifies as adequate triggering events are user defined, through menus that enable the receipt of user input that is operable to define the user settings.

In some embodiments, the settings for controlling what qualifies as adequate triggering events are based on chart type, element type, display type and/or chart visualization size, such that the settings differ for different types of charts, chart elements and/or display types.

Tagging Examples and Chart Optimization Examples

Some examples of different optimizations that can be performed responsive to the disclosed triggering events will now be described with reference to FIGS. 4-12.

Figure 4:
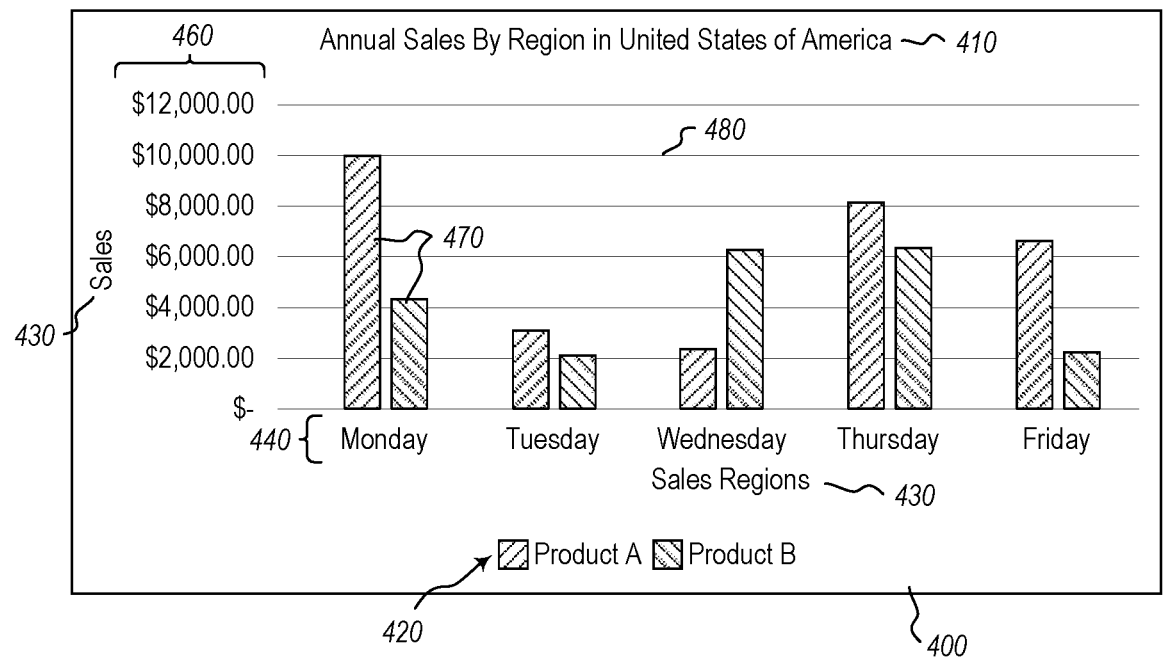
FIGS. 4-12 and 15-17 illustrate examples of charts having different sizes and configurations, in which some of the displayed chart elements are specifically configured to be tagged and/or which have been tagged for selectively preserving corresponding display attributes of the tagged chart elements during visualization optimizations.

As shown in FIG. 4, a chart visualization 400 is presented with various chart elements, including a title 410, a legend 420, axis category labels 430 (i.e., Sales and Sales Regions), tick mark labels 440 and tick mark labels 460 and graphical elements 470 (only some of which are referenced) and that visually reflect how the underlying data is related to both the different labeled categories (e.g., sales regions by day) and scaled sales values. The chart visualization 400 also includes gridlines 480 that help reflect relative magnitudes of the different underlying data intersections that are presently illustrated by the graphical elements 470.

Chart visualization 400 is resized, responsive to user input or an application process. In response to the chart resizing (e.g., before, during or after the actual rendering of the resized visualization), the computing system detects an overlap condition or another triggering event, as described above, for triggering the optimizing of the chart visualization in such a way as to affect rendering of one or more of the chart elements.

Figure 5:
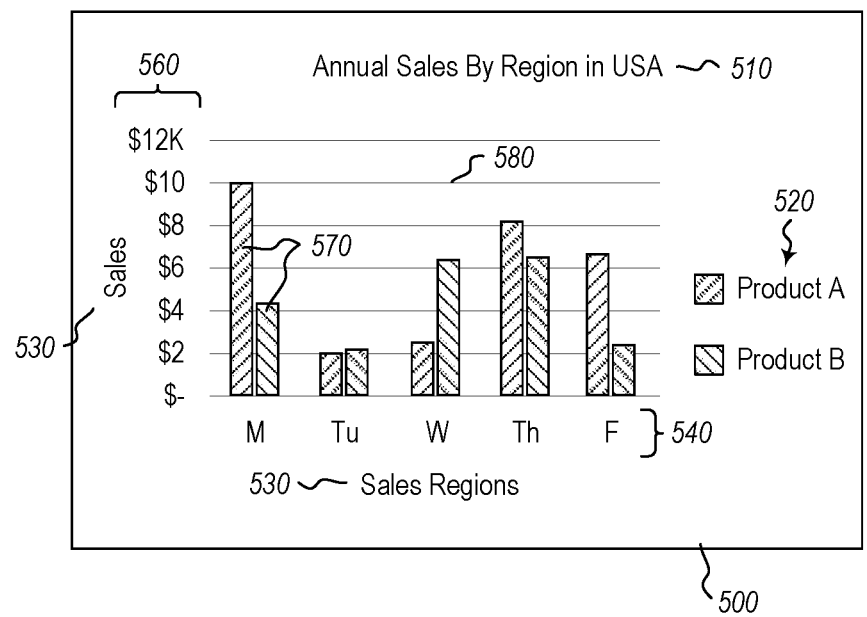
Figure 6:
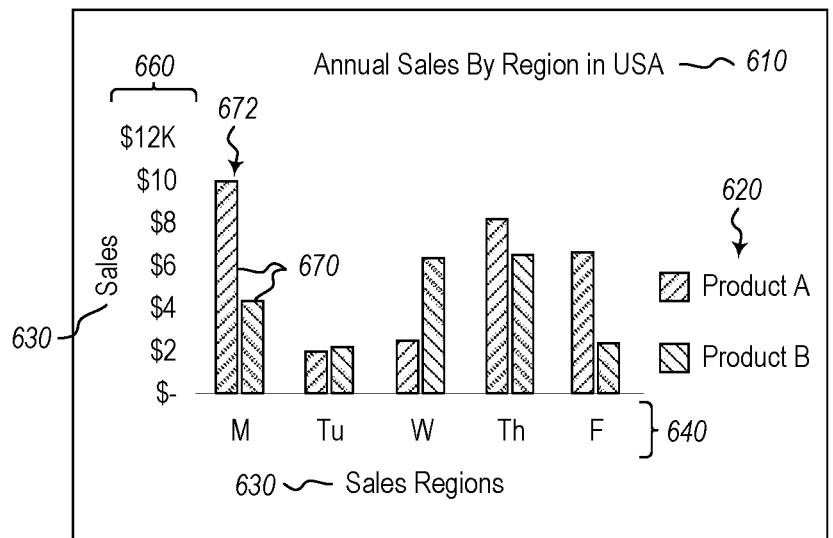

By way of example, the overlap condition triggers an optimization that results in a modification to the chart elements in such a way as to render resized chart visualization 500 of FIG. 5. Some of the modifications include abbreviating a portion of the title 510 (e.g., using the term USA instead of United States of America), abbreviating the numerical presentation of the tick mark labels 540 and 560, and moving the legend 520. The modifications are selectively limited and based (at least in part) on which elements have been tagged and which display attributes for the tagged elements are identified (implicitly or explicitly) to be preserved during the modification of the chart (based on the stored default display attribute settings). For instance, in this example, the legend 420 has been tagged and the display attributes for the legend 420 (as specified in the default set of attributes) only required the preservation of the legend 420 and/or size of the legend 420. Accordingly, optimizations may include moving the legend 420 and reconfiguring the legend 420 as legend 520 in FIG. 5, as long as the identified display attributes are preserved. Alternatively, if the location of the legend 420 was also specified as a required display attribute to preserve, then the location of the legend would also be preserved.

Further resizing of the chart visualization 500, which triggers yet another optimization (e.g., by causing an overlap of the legend 520 with the gridlines 580, or another triggering event), results in the system automatically removing some of the tick marks corresponding to tick mark labels 660 in the optimized and resized chart visualization 600. Also, the gridlines 580 are removed, such that the resized chart visualization 600 omits all gridlines. These omitted chart elements were untagged. Notably, however, that they would have be preserved and rendered, like the displayed elements 610, 620, 630, 640, and 660, if they had been tagged.

Figure 7:
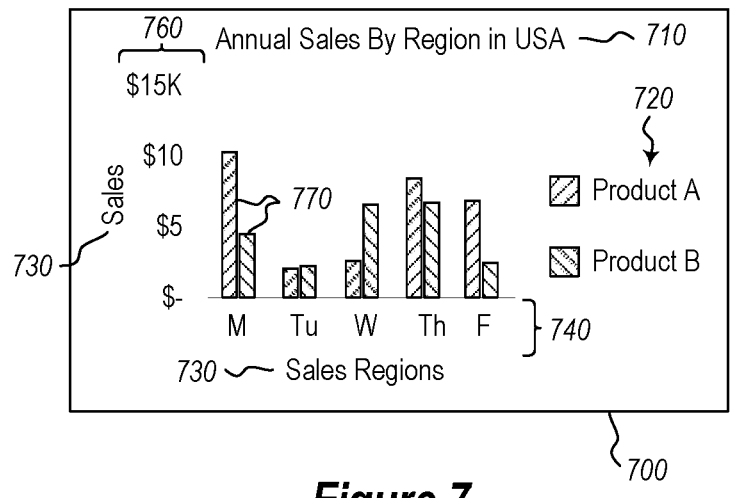

A further modification and optimization of the chart is reflected in FIG. 7. For instance, chart visualization 700 omits the category axis labels 630 of visualization 600, as these elements were untagged. The remaining elements (710, 720, 730, 740 and 760) are displayed because the system automatically determined they should remain, based on default settings, and/or because one or more of these elements were tagged prior to this latest optimization.

Figure 8:
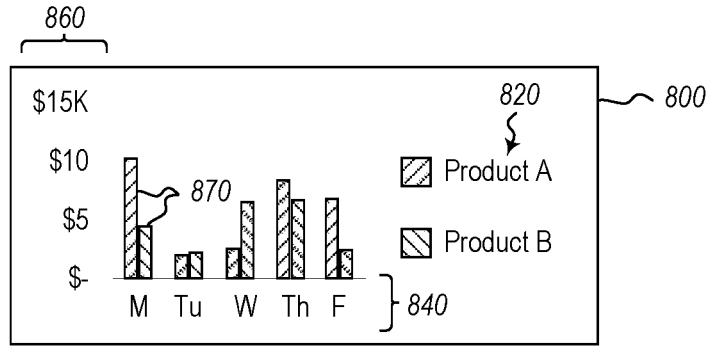

When chart visualization 700 is further reduced in shape and size, it triggers yet another optimization that is reflected by visualization 800 of FIG. 8. In this optimized visualization 800, the title 710 of visualization 700 has been dropped, along with a few other untagged elements. The legend 820 and the labels 840 and 860 remain with the chart elements 870 because they were either tagged and/or because the system determined they had a higher priority value than the removed elements.

Figure 9:
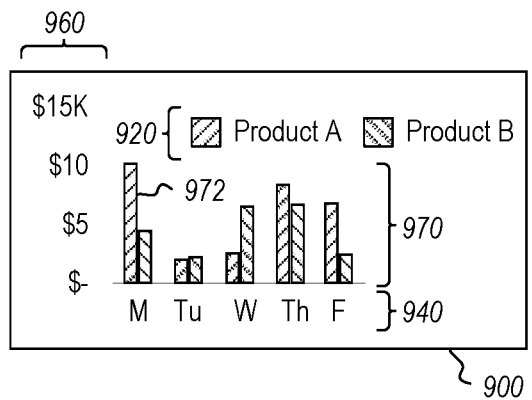
Figure 10:
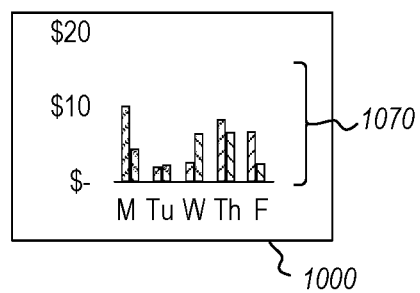

When chart visualization 800 is further reduced in shape and size, another triggering event is detected, which results in another optimization and the creation of visualization 900 of FIG. 9. In this optimized visualization 900, the legend 920 is repositioned and reconfigured. The legend 820 is preserved in this example, along with chart elements 970 and labels 940 and 960, however, because one or more of these elements were identified as tagged elements and the system preserved the default set of display attributes identified for those tagged elements in the manner that is currently reflected by the visualization 900. For example, the system reconfigured and moved the legend 920 rather than completely removing the legend, because the identified display attributes to be preserved for the legend included size and presence. But, the configuration and location attributes were not identified by the stored settings.

Figure 11:
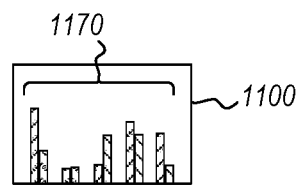
Figure 12:
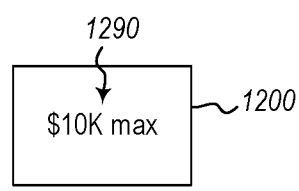

Notably, in each of the foregoing examples, the modifications made during chart optimizations include preserving at least one display attribute for corresponding tagged elements. The effects of tagging and the corresponding preservation of display attributes is limited, according to some embodiments, to only a single chart optimization. In other embodiments, the preservation of display attributes will continue to persist/apply to a plurality of sequential and/or different optimizations that are made in response to one or more different triggering events. For instance, if a user tagged chart element 972 from FIG. 9, the chart element will continue to persist the corresponding display attributes for chart elements 1070 during the creation of optimized visualization 1000 of FIG. 10. This tagging effect will also continue to persist for a subsequent optimization that is triggered by a further reduction in the size of the chart visualization that results in chart visualization 1100 (FIG. 11). Ultimately, when the chart is even further modified, to create optimized visualization 1200 (FIG. 12), based on yet another triggering event, the display attribute to be preserved (i.e. the value of the underlying data for the tagged chart element 972 of FIG. 9) is ultimately reduced to the presentation of only that value (1290), while all of the remaining chart elements have been removed (as they were untagged).

Figures 13, 14:
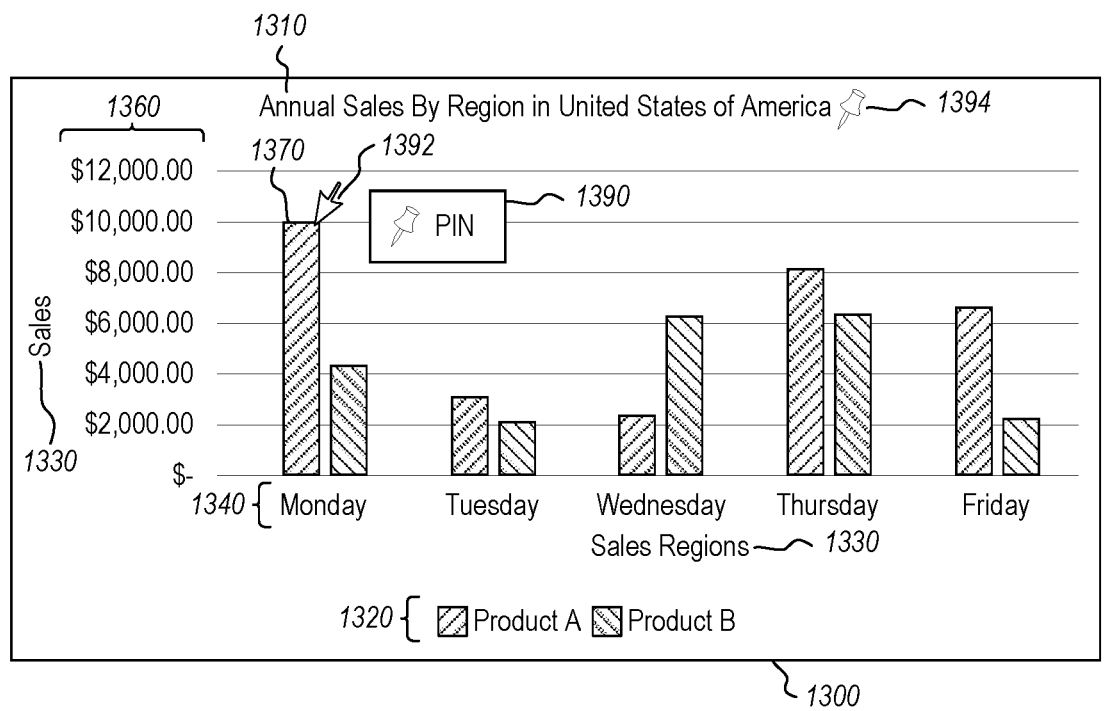
FIGS. 13-14 illustrate different tagging control elements that are operable to tag chart elements for selectively preserving corresponding display attributes of the tagged chart elements.

Some non-limiting examples of tagging controls that are usable to facilitate the actual tagging of chart elements will now be specifically shown and described in reference to FIGS. 13 and 14. In FIG. 13, a chart visualization 1300 is illustrated with various chart elements, including a title 1310, a legend 1320, axis labels 1330, tick mark labels 1340 and 1360 and chart bars corresponding to underlying data elements (including bar 1370). In this example, a user directs input to an element they desire to tag (e.g., element 1370). This is done, according to one embodiment, by hovering a mouse prompt 1392 over the element, by selecting the element with a mouse click, by touch applied to a touch sensitive display, by providing a key command, selecting the element from a menu and/or by providing any other input that is operable for selecting a desired element to be tagged. In response to this tagging input, the item is tagged and/or the user is provided another option for tagging the element. In some instances, the tagging input initiates a prompt to the user for an identification of one or more specific display attributes to be preserved. Alternatively, default display attributes are assigned and/or identified.

In one embodiment, a user selects a chart element to initiate the display of a separate tagging object (e.g., selectable pin object interface 1390) that is operable, when selected, to tag the element. Once the element is tagged, a flag, value or other data reference is made to a stored tagged element data structure that is referenced by the system to determine which elements are tagged.

The tagging of an element also causes a corresponding pin, flag, label and/or other visible object to be displayed next to the tagged element within the chart, to visually reflect that the tagged element has been effectively tagged. By way of example, pin 1394 is currently displayed proximate title 1310 to indicate that title 1310 has been tagged. In one embodiment, the tagged object is only rendered when input/focus is concurrently directed to the tagged element. For instance, pin 1394 might remain hidden until mouse prompt 1392 is repositioned over the title 1310, at which point the pin 1394 will be temporarily displayed for a predetermined period of time (e.g., 1 or more seconds) and/or until the mouse prompt moves off of the title.

Additionally, or alternatively, the tagged element is be rendered differently (without modifying the specific default attribute that is to be preserved) in order to reflect the element has been tagged, by changing a font or other display attribute of the element, subsequent to the tagging and/or whenever input/focus is directed to the tagged element.

FIG. 14 reflects a tagging interface menu 1400 that is displayed, in some embodiments, for enabling a user to tag one or more chart elements. This menu can be displayed in response to a user selecting a chart, a chart element or a menu option associated with the chart. Then, once displayed, the tagging interface menu 1400 is operable to receive input at a menu option 1440 that causes a display of different chart elements available to be selected and which, when selected are effectively tagged. The type of element that is displayed by the interface menu 1400 is changeable by selecting option 1440. Currently, menu option 1440 has been selected in such a way as to cause a display of different values and product lines that are available for tagging. Selection of any of those options will cause the corresponding chart elements to be tagged. Selection of option 1440 will also enables a display of other options/subcategories of elements that are available to be selected (e.g., legends, titles, labels and other chart elements). If a user wishes to undo the tagging of elements, they can select an option, such as the illustrated 'revert to defaults,' or another menu option.

Figure 15:
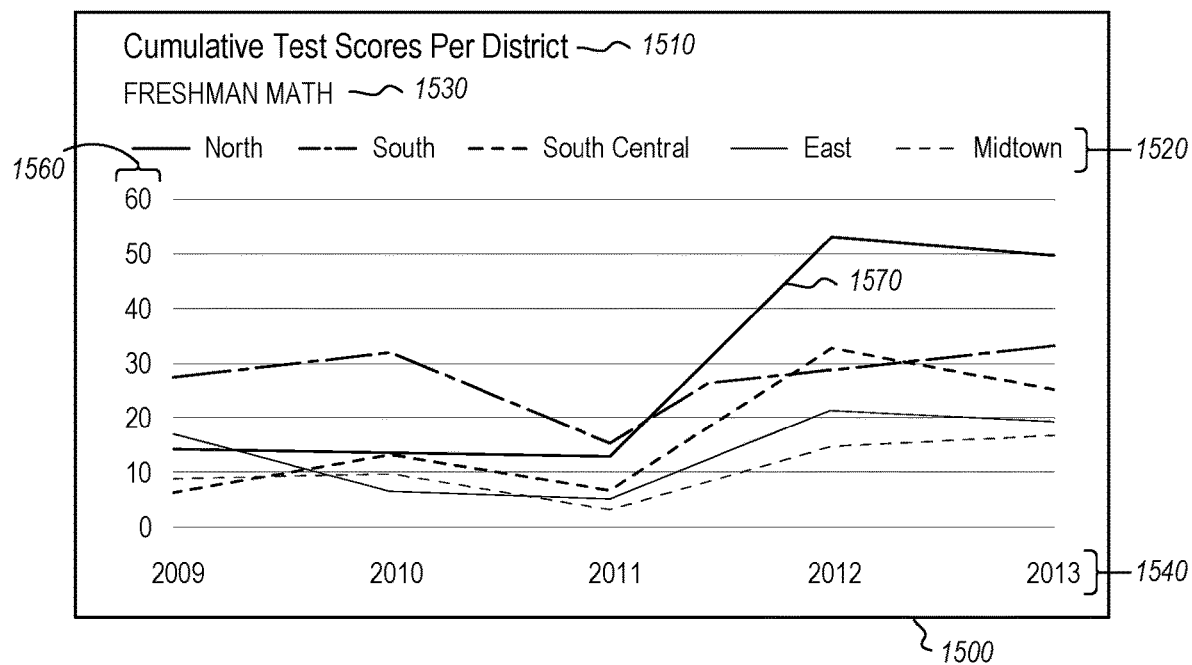
Figure 16:
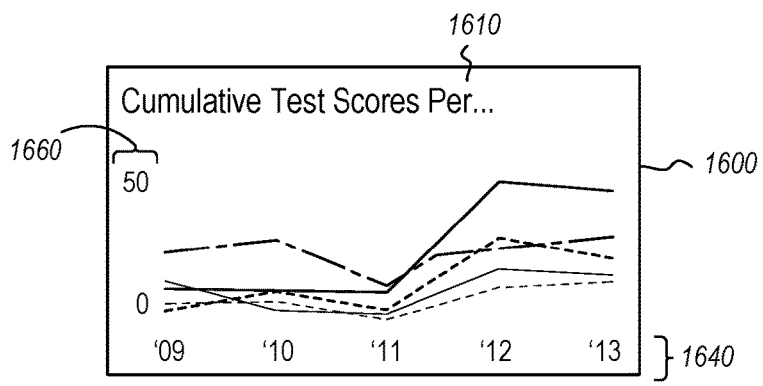
Figure 17:
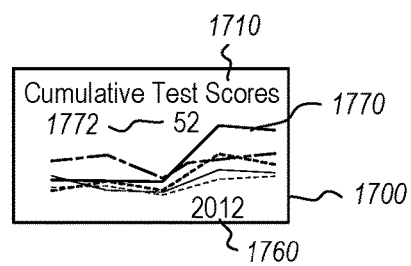

FIGS. 15-17 illustrate yet another example in which multiple elements can be tagged and in which preservation of display attributes for tagged chart elements occurs through the presentation of new chart elements, as specified by the stored default display attribute settings and based on detected conditions.

In FIG. 15, a chart visualization 1500 is shown for freshman math test scores based on time and district locations. In this example, a category title 1510 is displayed with a subcategory title 1530, along with a legend 1520 and axis tick mark values 1540, even though the corresponding axis labels are not displayed. In this example, a user has tagged the North District series, currently visualized as graphed element 1570. The user has also tagged the category title 1510.

A triggering event, such as a resizing of the chart or another triggering event, has been detected. This triggering event has resulted in an optimizing of the chart 1500 that is realized as chart visualization 1600 of FIG. 16. In this optimization, many of the chart elements from chart 1500 have been removed, as they were untagged. Some of the chart elements have also been abbreviated (i.e., the tick mark labels 1640). Notably, however, the North District series graph element 1570 remains displayed, along with the category title 1610. However, due to size constraints, the category title 1610 has been replaced, even though it was tagged, by a new abbreviated title, as permitted according to the default/defined set of display attributes contained in a referenced table. This replacement was permitted as it still preserves at least one identified display attribute of the tagged element (e.g., location, size and/or critical terms 'cumulative test scores.') based on the currently detected condition (e.g., a first specific size constraint).

When the chart visualization 1600 is further reduced in size, triggering yet additional optimizations, additional chart elements are removed. The resulting chart visualization 1700 still preserves critical/identified display attributes of tagged elements, however. For instance, the title 1710 remains, albeit at a reduced size and with a defined suitable alternative according to stored default settings to be applied when a second condition is detected (e.g., a second specific size constraint occurs). This is possible because of the identification of a tiered/hierarchical set of default display attributes for the corresponding tagged element in a stored data structure that is accessed by the computing system during the optimization.

Graph element 1770 was also tagged and continues to be displayed with the appropriate and identified display attribute to be preserved. However, in this instance, the display attribute that is identified to be preserved for element 1770 is a date and value combination for the highest value of that element. But, this combination would be virtually undeterminable once the tick mark labels 1640 and 1660 of FIG. 16 were removed (as they were because they were untagged and the optimization removed the untagged elements). Nonetheless, the identified display attribute of the tagged element 1770 is still preserved in this example, by the system adding data to the chart (i.e., a specific recitation to the underlying data value '52' (1772)). The date reference '12 has also been replaced by the date reference '2012' (1760), as required by the default display attribute settings for the currently detected conditions (e.g., a particular chart size and an addition of a data value).

Accordingly, the previous example illustrates how a display attribute can be preserved by adding data and/or by explicitly reciting data that was previously reflected inherently through the presence of other chart elements when those other chart elements (which were untagged) are correspondingly modified during chart optimizations.

Many of the foregoing aspects of the disclosed embodiments are usable to facilitate the optimization of chart visualization and to provide user controls for enabling a user to selectively tag or otherwise identify which display elements and attributes will be preserved during chart visualization optimizations. While many of the foregoing examples regarding chart optimizations and tagging controls have been described with regard to bar charts, it will be appreciated that the scope of this disclosure relates to optimizations and triggering events for all types of chart visualizations.

Furthermore, although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. A computing system configured for utilizing tagging controls for selectively preserving particular display attributes for tagged chart elements during chart visualization optimizations, the computing system comprising:
   one or more processors; and
   one or more hardware storage device having stored computer-executable instructions which are executable by the one or more processors to cause the computing system to perform the following:
   access a chart visualization that includes a plurality of different chart elements, each of the different chart elements having display attributes that are modifiable during optimization of the chart visualization;
   detect tagging input that comprises user input that is directed at and that tags one or more chart elements including a particular chart element of the plurality of different chart elements;
   in response to the detected tagging input, initiate a prompt for an identification of one or more specific display attributes to be preserved during optimization of the chart visualization;
   detect user input selecting in the prompt at least one particular display attribute to be preserved during optimization of the chart visualization;
   detect chart modification input that is operable to initiate an optimization of the chart visualization and that will thereby affect visualization of one or more untagged chart elements of the plurality of different chart elements during the optimization of the chart visualization; and
   selectively modify a visualization of the one or more untagged elements while performing the optimization of the chart visualization and while preserving the at least one particular display attribute of the particular chart element that was tagged so that the at least one particular display attribute of the particular chart element remains unchanged while the visualization of the one or more untagged chart element changes.

2. The computing system of claim 1, wherein the tagging input explicitly identifies the at least one particular display attribute.

3. The computing system of claim 1, wherein the tagging input implicitly identifies the at least one particular display attribute.

4. The computing system of claim 1, wherein the tagging input includes user input selecting a selectable interface pin object that is displayed for selection in response to a previous selection or focus input directed to the particular chart element.

5. The computing system of claim 1, wherein the tagging input includes user input selecting the at least one particular display attribute from a listing of one or more display attributes associated with the particular chart element in response to a previous selection or focus input directed to the at least one particular chart element.

6. The computing system of claim 1, wherein the at least one particular display attribute includes a label or value associated with the particular chart element.

7. The computing system of claim 1, wherein the at least one particular display attribute of the particular chart element comprises a critical term for the particular chart element.

8. The computing system of claim 1, wherein the optimization of the chart visualization includes removing untagged chart elements from the chart visualization.

9. The computing system of claim 8, wherein preserving of the at least one particular display attribute includes preserving a display of the particular chart element that would have been removed from the chart visualization during the optimization absent the tagging input tagging the particular chart element.

10. The computing system of claim 1, wherein the optimization of the chart visualization includes increasing a transparency of chart elements or otherwise reducing a visibility of the chart elements without removing the chart elements.

11. A computer-implemented method for utilizing tagging controls for selectively preserving a particular display attribute for tagged chart elements during chart visualization optimizations, the method being implemented by a computing system that includes at least one processor and one or more hardware storage device having stored computer-executable instructions that are executable by the at least one processor for causing the computing system to implement the method, the method comprising:
   the computing system accessing a chart visualization that includes a plurality of different chart elements, each of the different chart elements having a display attribute that is modifiable during optimization of the chart visualization;
   the computing system detecting tagging input that comprises user input that is directed at and that tags two particular chart elements of the plurality of different chart elements, the tagging input identifying a particular display attribute for the two particular chart elements;
   the computing system detecting chart modification input that alters a display size of an untagged chart element of the plurality of different chart elements;
   while selectively modifying the display size of the untagged element in response to the chart modification input, the computing system detecting the presence of an overlap condition between the two particular chart elements that were tagged by the detected tagging input; and
   in response to the detected overlap condition, the computing system performing an optimization of the chart visualization while preserving the particular display attribute for the two particular chart elements that were tagged, wherein the preserving of the particular display attribute of the two particular chart elements includes inserting a new value or reference that corresponds to one of the two particular chart elements and that replaces the one of the two particular chart elements while preserving the particular display attribute of the one of the two particular chart elements.

12. The method of claim 11, wherein the method further includes the computing system displaying a selectable interface pin object in response to a selection of the two particular chart elements or focus input being directed to the two particular chart elements and wherein the tagging input includes user input selecting the selectable interface pin.

13. The method of claim 11, wherein the particular display attribute includes a location of the two particular chart elements.

14. The method of claim 11, wherein the optimization of the chart visualization includes resizing of the chart visualization and removing the untagged chart element from the chart visualization and wherein the two particular chart elements would have been removed from the chart visualization during the optimization absent the tagging input tagging the two particular chart elements.

15. The method of claim 11, wherein the optimization of the chart visualization includes increasing a transparency of chart elements or otherwise reducing a visibility of the chart elements without removing the chart elements.

16. One or more hardware storage device having stored computer-executable instructions which are executable by one or more processors of a computing system to configure the computing system to optimize chart visualizations and to selectively preserve a display attribute of a tagged chart element and by at least configuring the computing system to perform the following:
    access a chart visualization that includes a plurality of different chart elements, each of the different chart elements having a display attribute that is modifiable during optimization of the chart visualization;
    tag input that comprises user input that is directed at and that tags a particular chart element of the plurality of different chart elements;
    in response to the detected tagging input, the computing system initiating a prompt for an identification of a display attribute;
    detect user input selecting in the prompt a particular display attribute;
    detect chart modification input that is operable to initiate an optimization of the chart visualization and that affects visualization of an untagged chart element of the plurality of different chart elements during the optimization of the chart visualization; and
    selectively modify a visualization of the untagged element while performing the optimization of the chart visualization and while preserving the particular display attribute of the particular chart element that was tagged.

17. The one or more hardware storage device of claim 16, wherein the stored computer-executable instructions are further are executable to configure the computing system to display a selectable interface pin object in response to a selection of the particular chart element or focus input being directed to the particular chart element and wherein the tagging input includes user input selecting the selectable interface pin.

18. The one or more hardware storage device of claim 16, wherein the particular display attribute includes a label or value associated with the particular chart element and wherein the preserving of the particular display attribute of the particular chart element includes abbreviating the label or value.

19. The one or more hardware storage device of claim 16, wherein the optimization of the chart visualization includes resizing of the chart visualization and removing the untagged chart element from the chart visualization and wherein the particular chart element would have been removed from the chart visualization during the optimization absent the tagging input tagging the particular chart element.

* * * * *